(12) United States Patent
Devenyi

(10) Patent No.: US 7,246,537 B1
(45) Date of Patent: Jul. 24, 2007

(54) WIRE-WOUND LEADSCREW ASSEMBLY WITH A PRELOADED LEADSCREW WIRE NUT, AND ITS FABRICATION

(75) Inventor: Gabor Devenyi, Penetanguishene (CA)

(73) Assignee: Raytheon Company, Waltham, MA (US)

( * ) Notice: Subject to any disclaimer, the term of this patent is extended or adjusted under 35 U.S.C. 154(b) by 593 days.

(21) Appl. No.: 10/639,958

(22) Filed: Aug. 12, 2003

Related U.S. Application Data

(63) Continuation-in-part of application No. 10/364,977, filed on Feb. 12, 2003, now Pat. No. 6,883,396, which is a continuation-in-part of application No. 10/084,704, filed on Feb. 26, 2002, and a continuation-in-part of application No. 10/265,814, filed on Oct. 7, 2002, now abandoned.

(51) Int. Cl.
*F16H 1/24* (2006.01)
(52) U.S. Cl. .................. 74/424.77; 74/424.71
(58) Field of Classification Search ............. 74/424.71, 74/424.77, 424.73, 89.23, 89.32, 89.42, 409, 74/440, 424.74
See application file for complete search history.

(56) References Cited

U.S. PATENT DOCUMENTS

| | | | |
|---|---|---|---|
| 2,629,080 A * | 2/1953 | Carlson ................... 336/136 |
| 2,925,743 A * | 2/1960 | Wise ..................... 74/424.77 |
| 3,161,849 A * | 12/1964 | Bourns et al. ............ 338/183 |
| 3,534,626 A * | 10/1970 | Elliott et al. ............ 74/424.77 |
| 4,074,463 A * | 2/1978 | Colanzi .................... 49/352 |
| 4,570,893 A * | 2/1986 | Ballantyne ................ 248/487 |
| 5,101,213 A * | 3/1992 | Harada et al. ............ 343/715 |
| 5,533,417 A | 7/1996 | Devenyi |
| 5,636,549 A | 6/1997 | Devenyi |
| 6,459,844 B1 * | 10/2002 | Pan ........................ 385/140 |
| 6,513,403 B2 * | 2/2003 | Yatskov ................. 74/424.77 |

\* cited by examiner

*Primary Examiner*—Richard Ridley
*Assistant Examiner*—Matthew A. Johnson
(74) *Attorney, Agent, or Firm*—Rene Grossman, Esq.; Leonard A. Alkov, Esq.; Horace St. Julian, Esq.

(57) ABSTRACT

A leadscrew assembly includes a leadscrew having a leadscrew thread wire helically wound about a leadscrew axis in a plurality of cylindrical leadscrew-thread turns and having a leadscrew-thread pitch. A leadscrew wire nut assembly includes a nut-assembly wire helically wound about the leadscrew axis in a plurality of cylindrical nut-assembly turns and having a nut-assembly-thread pitch. The nut-assembly-thread pitch is substantially the same as the leadscrew-thread pitch, the nut-assembly turns overlie and mesh with the leadscrew-thread turns, and the nut-assembly wire has a permanent deformation therein. A wire-nut-assembly housing overlies and is bonded to at least some of the nut-assembly turns.

14 Claims, 3 Drawing Sheets

WIRE-WOUND LEADSCREW ASSEMBLY WITH A PRELOADED LEADSCREW WIRE NUT, AND ITS FABRICATION

This application is a continuation-in-part of application Ser. No. 10/364,977, filed Feb. 12, 2003 now U.S. Pat. No. 6,883,396, for which priority is claimed and whose disclosure is incorporated by reference; which in turn is a continuation-in-part of application Ser. No. 10/084,704, filed Feb. 26, 2002, for which priority is claimed and whose disclosure is incorporated by reference; and is a continuation-in-part of application Ser. No. 10/265,814, filed Oct. 7, 2002 now abandoned, for which priority is claimed and whose disclosure is incorporated by reference.

This invention relates to a mechanical movement to translate rotational to linear motion and, more particularly, to a wire-wound leadscrew linear-movement assembly.

BACKGROUND OF THE INVENTION

Electric motors commonly produce a rotational output, but many mechanisms require that a linear movement be driven by the motor. A leadscrew assembly is one approach for translating the rotational movement of the motor to the required linear movement. In the conventional leadscrew assembly, the thread of an externally threaded leadscrew engages a recirculating ball nut structure, which in turn is engaged to the structure to be driven linearly. As the leadscrew turns, the ball nut structure and the driven structure move linearly.

This conventional leadscrew assembly is relatively expensive to produce due to the precision machining required. It is also limited to relatively large-size devices and coarse thread pitches because of the size of the balls used in the recirculating ball nut structure. The conventional leadscrew assembly may be subject to excessive wear of the threads, particularly if there is any misalignment in the assembly. The conventional leadscrew assembly also requires careful alignment between the motor, the leadscrew, and the driven structure because of the mechanical engagements at each end of the leadscrew.

An advance in overcoming some of these disadvantages is described in U.S. Pat. No. 5,636,549, whose disclosure is incorporated by reference. The '549 patent discloses a leadscrew in which the thread structure is defined by a wire wound helically around a cylindrical shaft. A leadscrew-nut assembly is also disclosed for engaging the leadscrew to the linear slide assembly.

The approach of the '549 patent is operable for many applications but is not optimal for other applications such as those requiring medium-duty operation where there is a concern with possible misalignment. There is a need for realizing the advantages of the basic approach disclosed in the '549 patent, but in a form more suitable to these other applications, and which reduces the concern with alignment of the elements. The present invention fulfills this need, and further provides related advantages.

SUMMARY OF THE INVENTION

The present invention provides a leadscrew assembly that is particularly suitable for medium-duty applications wherein the loads and speeds of movement are moderate in magnitude. It is highly tolerant of misalignments and is preloaded to avoid backlash and play in the system when the direction of movement is reversed. The leadscrew assembly may be scaled over a wide range of sizes and stiffnesses, but is most desirably applied in small-size applications where the loadings are of medium magnitude. The leadscrew assembly is inexpensive to produce.

In accordance with the invention, a leadscrew assembly comprises a leadscrew having a leadscrew thread wire helically wound about a leadscrew axis in a plurality of cylindrical leadscrew-thread turns having grooves therebetween and a leadscrew-thread pitch, and a leadscrew wire nut assembly. It is preferred that the leadscrew has no shaft extending therethrough, but a shaft may be used. The leadscrew thread wire may be helically wrapped in spaced-apart turns, or helically wrapped in helical contact. Desirably, the leadscrew thread wire is wrapped in a cylindrical helix. The leadscrew may be prepared by winding the leadscrew thread wire onto a winding form, and removing the form if the leadscrew is to be shaftless, or leaving the form in place to serve as a leadscrew shaft, or removing the winding form and inserting a separate shaft. Preferably, the leadscrew assembly further includes a mechanical drive such as a motor in rotational communication with the leadscrew.

The leadscrew wire nut assembly includes a nut-assembly wire, preferably a single continuous piece of wire material, helically wound about the leadscrew axis in a plurality of cylindrical nut-assembly turns and having a nut-assembly-thread pitch. The nut-assembly-thread pitch is substantially the same as the leadscrew-thread pitch, the nut-assembly turns overlie and mesh with the leadscrew-thread turns, and the nut-assembly wire has a permanent deformation therein to produce a preload. A wire-nut-assembly housing overlies and is bonded to at least some of the nut-assembly turns.

In a first preferred embodiment, the leadscrew wire nut assembly comprises the nut-assembly wire having a first axial wire region, a second axial wire region, and a third axial wire region lying between the first axial wire region and the second axial wire region. A first wire nut region comprises at least one turn of the first axial wire region overlying and engaged to the groove between the turns of the leadscrew thread wire, and a second wire nut region comprising at least one turn of the second axial wire region overlying and engaged to the groove between the turns of the leadscrew thread wire. The second wire nut region is spaced apart from the first wire nut region along the leadscrew axis, and the third axial wire region maintains a compression preload against the first wire nut region and the second wire nut region. Preferably, the third axial wire region has a circumferentially extending volume of material removed therefrom.

Preferably, the first wire nut region and the second wire nut region are bonded to the wire-nut-assembly housing. At least one of the first wire nut region and the second wire nut region is resiliently bonded to the wire-nut-assembly housing. The wire-nut-assembly housing may be a single continuous piece of a wire-nut-assembly housing material, or a multipart housing.

The nut assembly wire desirably has a first cross-sectional wire area in the first axial wire region, a second cross-sectional wire area in the second axial wire region, and a third cross-sectional wire area in the third axial wire region. The third cross-sectional wire area is less than either of the first cross-sectional wire area and the second cross-sectional wire area. Alternatively or additionally, the nut-assembly wire may be wound into a nut-assembly wire coil having a substantially constant inner diameter and a first-axial-wire-region outer diameter, a second-axial-wire-region outer diameter, and a third-axial-wire-region outer diameter. The third-axial-wire-region outer diameter is less than either of the first-axial-wire-region outer diameter and the second-axial-wire-region outer diameter.

In a second preferred embodiment, the nut-assembly turns include a permanently off-axis deformed nut-assembly turn.

With either of these preferred embodiments, the nut assembly wire may be preloaded by first winding the nut assembly wire to the desired helical shape. Before assembling it onto the leadscrew, the helical coil of the first embodiment has a circumferential volume of material removed to weaken the third axial wire region, and then is stretched axially so that the third axial wire region is permanently deformed and the resulting natural pitch in the third axial wire region is greater than that in either of the first axial wire region and the second axial wire region. Upon assembly onto the constant-pitch leadscrew whose pitch is matched to those of the first axial wire region and the second axial wire region of the leadscrew wire nut assembly, the third axial wire region is in a compressive preload state. In the second embodiment, one or more turns of the helical coil of the wire-nut assembly are permanently deformed, preferably in an off-axis manner. When the helical coil is engaged to the leadscrew, the permanently deformed region introduces a preloading. Thus, the preloaded wire nut assembly is achieved with a single length of nut-assembly wire, rather than two lengths at the ends and a separate spring in the center, thereby keeping the piece count of the assembly small and simplifying the assembly process.

The present approach provides a wire-wound leadscrew with a preloaded leadscrew wire nut assembly. The preloading of the leadscrew wire nut assembly locally increases the rigidity of the wire-wound leadscrew within the leadscrew wire nut assembly, while maintaining the flexibility of the leadscrew outside of the leadscrew wire nut assembly, particularly in the case of the shaftless leadscrew. The engagement between the leadscrew and the leadscrew wire nut assembly is a line engagement that extends around the circumference of the leadscrew at least once, and preferably for several turns. The increased rigidity of the leadscrew/leadscrew wire nut assembly and the long line engagement permits the wire-wound leadscrew to transmit substantial force into the follower, so that the leadscrew assembly is suitable for medium-duty applications rather than being restricted to light-duty applications. Yet the wire-wound leadscrew is still sufficiently flexible that it does not require the highly precise alignment required of conventional machined leadscrews. The line contact between the leadscrew thread wire and the first-nut wire and the second-nut wire avoids any digging of the leadscrew wire nut assembly into the leadscrew thread wire.

The present approach is self correcting of potential misalignments between the leadscrew and the leadscrew wire nut assembly. It is tolerant of shock loadings and jamming of the leadscrew and the wire nut assembly, as well as variations in friction and axial loadings. The jamming of conventional machined leadscrews and recirculating-ball followers is of great concern, and jamming can arise from several different types of misalignments. The present approach is highly tolerant of misalignments, and jamming is virtually eliminated. The present approach is also tolerant of variations in the loading in the preload spring. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
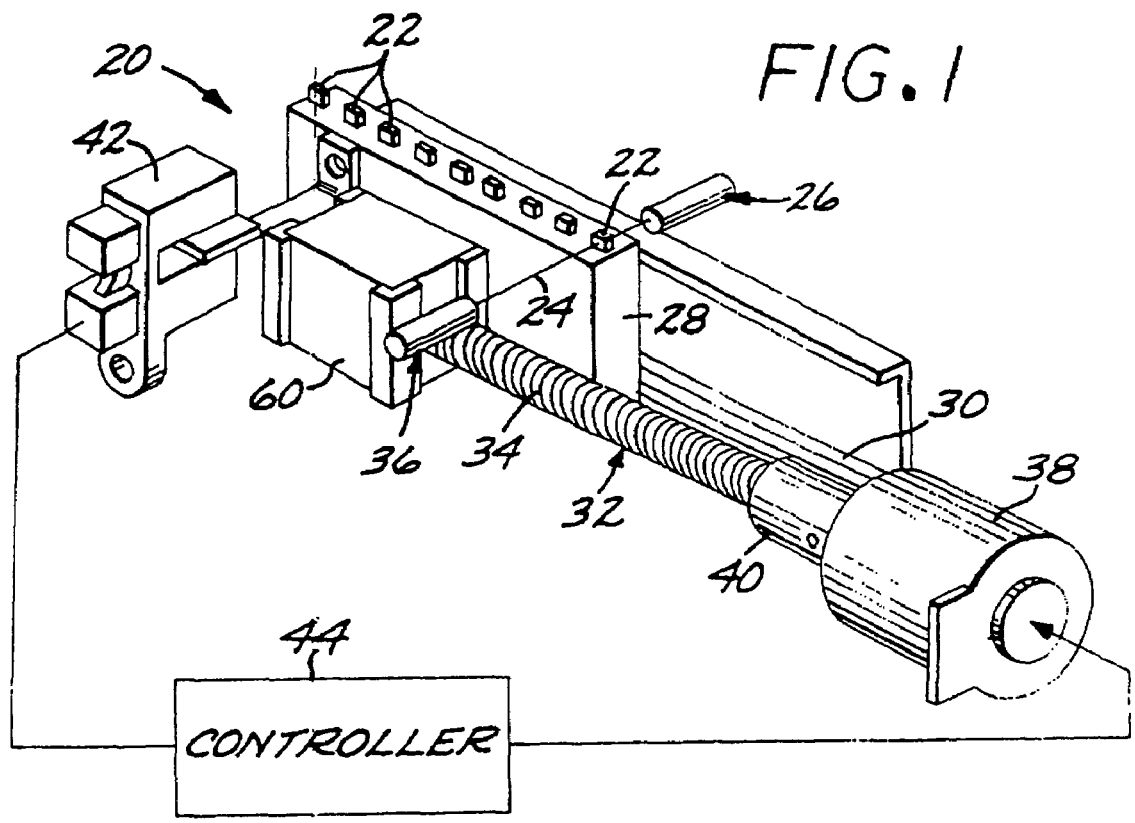
FIG. 1 is a schematic perspective view of a leadscrew assembly used in a filter module.

FIG. 1 depicts a leadscrew assembly 20 in one of its applications. As illustrated, the leadscrew assembly 20 includes a filter module which controllably places a light filter 22 into a light path 24 of an optical fiber light transmission system 26 and thereafter controllably removes the light filter 22 from the light path 24. The leadscrew assembly 20 is presented as an example of a leadscrew drive and its application, but the invention is not so limited. The leadscrew assembly 20 comprises a linearly movable support 28 upon which at least one light filter 22, and preferably a plurality of light filters 22, are mounted. The movable support 28 in the illustrated embodiment is a linear slide mechanism that is linearly movable upon a linear bearing 30. A drive mechanism 32 is operably connected to the movable support 28 to controllably move the individual light filters 22 into and out of the light path 24.

The drive mechanism 32 includes a leadscrew 34 drivably connected to the movable support 28 through a leadscrew follower 36. A controllable mechanical drive 38, depicted as a motor and specifically as a stepper motor, with a rotating output 40 is in rotational communication with and drives the leadscrew 34, in turn driving the movable support 28 along the linear bearing 30. Optionally but preferably, a positional indicating device 42 is provided in the drive mechanism 32 for indicating the position of the movable support 28. The mechanical drive 38 moves the movable support 28 to a selectable position, and the positional indicating device 42 provides an indication of the actual position of the movable support 28 either continuously or at a fixed location such as an end point of the travel of the movable support 28. The output of the positional indicating device 42 may be used as input to a motor controller 44 that controls the operation of the mechanical drive 38. The motor controller 44 may operate in either this feedback mode or in a non-feedback mode based upon the step positions of the mechanical drive 38.

Figure 2:
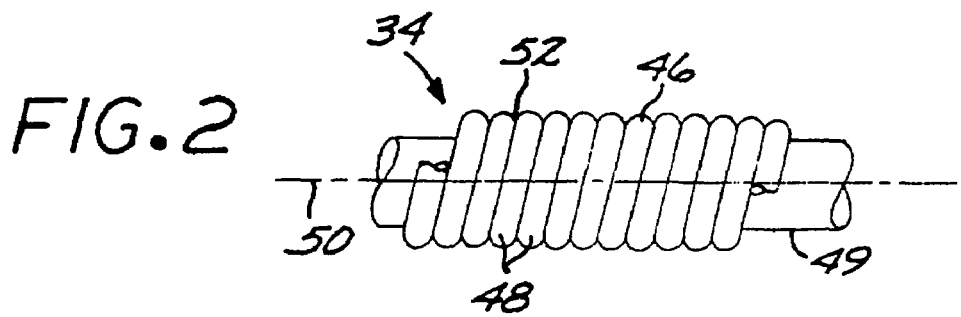
FIG. 2 is an elevational view of a wire-wound leadscrew with helically contacting turns.
Figure 3:
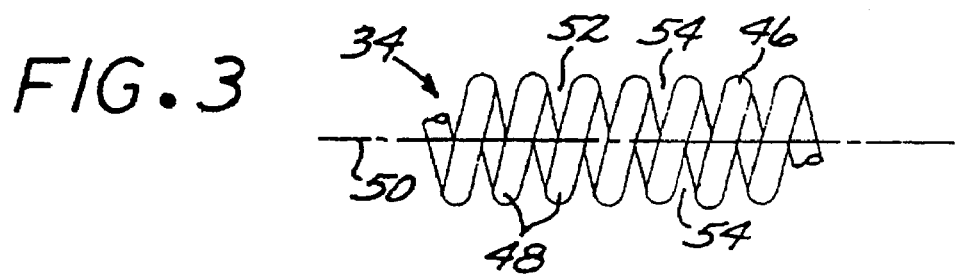
FIG. 3 is an elevational view of a wire-wound leadscrew with spaced-apart turns.

FIGS. 2-3 depict two embodiments of the leadscrew 34 in greater detail. The leadscrew 34 comprises a leadscrew thread wire 46 helically wound in a plurality of leadscrew-thread turns 48 about a leadscrew axis 50. The leadscrew axis 50 may be straight or curved. The leadscrew-thread turns 48 may be in side-by-side, helical contact, as illustrated in FIG. 2, or spaced-apart from each other, as illustrated in FIG. 3. As used herein, "helical contact" means that each helical leadscrew-thread turn 48 of the leadscrew thread wire 46 is side-by-side with and contacts to, but is not joined to, the adjacent turn. As used herein, "spaced-apart" means that each helical leadscrew-thread turn 48 of the leadscrew thread wire 46 is side-by-side with, spaced apart from, and not joined to the adjacent turn; that is, there is a small gap 54 between each leadscrew-thread turn 48. The leadscrew-thread pitch $P_L$ of the leadscrew is expressed as the amount of advance along the leadscrew axis 50 per unit length of the leadscrew axis 50. In all forms of this embodiment, there may be a shaft 49, either rigid or flexible, extending through the interior of the helix and the helical leadscrew-thread turns 48 that define the leadscrew 34. The shaft 49 is shown in the embodiment of FIG. 2 and not in the embodiment of FIG. 3, but it may be present or absent in any embodiment of the leadscrew 34. The leadscrew thread wire 46 is preferably circular in cross section. The helix formed by the coiled leadscrew thread wire 46 is preferably a cylindrical helix that is initially symmetric about the leadscrew axis 50. However, the helix may be deformed so that the leadscrew axis 50 is not straight.

The helical wrap of the leadscrew thread wire 46 results in a helical coil that defines a groove 52 between the leadscrew-thread turns 48. There is such a groove 52 whether the leadscrew-thread turns 48 are in helical contact (FIG. 2) or are spaced-apart (FIG. 3).

The leadscrew follower 36 includes a leadscrew wire nut assembly 60 that is received in and moves along the groove 52 of the leadscrew 34 as the leadscrew 34 turns. The rotational motion of the leadscrew 34 is thereby translated into a linear motion such as required for movement of the linearly movable support 28.

Figure 4:
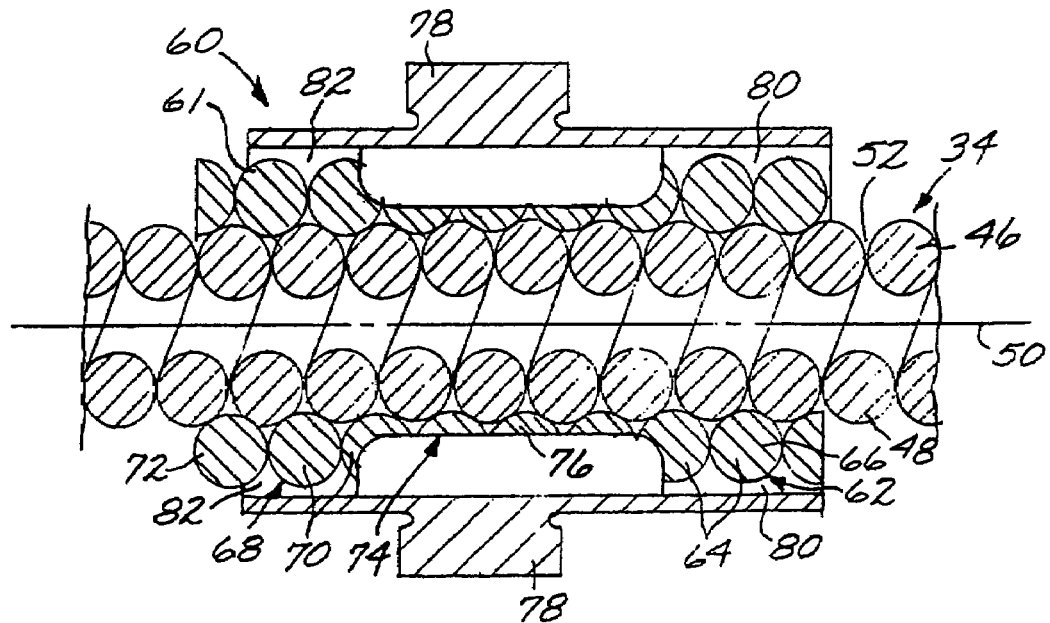
FIG. 4 is a side-sectional view of a wire-wound leadscrew with helically contacting turns, and engaged to a first embodiment of the leadscrew wire nut assembly.

FIG. 4 illustrates a first preferred embodiment of the leadscrew wire nut assembly 60. In the depicted embodiment, the helical-contact leadscrew 34 has no gap between the helical leadscrew-thread turns 48 and has no shaft 49, the preferred embodiment of the leadscrew 34 for this application. The leadscrew wire nut assembly 60 of FIG. 4 includes a single length of nut-assembly wire 61 wound in wire-helix turns 64, preferably cylindrical wire-helix turns, about the leadscrew axis 50. The nut-assembly-thread pitch $P_{NA}$ of the leadscrew wire nut assembly 60 is expressed as the amount of advance along the leadscrew axis 50 per unit length of the leadscrew axis 50, and is substantially the same as $P_L$. The nut assembly wire 61 is preferably made of high-carbon steel, such as piano wire. An inner diameter of the cylindrical-wire turns of the nut-assembly wire 61 is greater than an outer diameter of the cylindrical-helix turns of the leadscrew thread wire 46, but is made such that the helically wound nut assembly wire 61 overlies and meshes with the leadscrew-thread turns 48. The nut-assembly wire 61 has a first axial wire region 66, a second axial wire region 72, and a third axial wire region 76 lying between the first axial wire region 66 and the second axial wire region 72. These three regions are measured along the leadscrew axis 50.

The leadscrew wire nut assembly 60 includes a first wire nut region 62 comprising at least one turn 64 of the first axial wire region 66 overlying and engaged to the groove 52 between the leadscrew-thread turns 48 of the leadscrew thread wire 46 of the leadscrew 34, and a second wire nut region 68 comprising at least one turn 70 of the second axial wire region 72 overlying and engaged to the groove 52 between the leadscrew-thread turns 48 of the leadscrew thread wire 46. The second wire nut region 68 is spaced apart from the first wire nut region 62 along the leadscrew axis 50. The third axial wire region 76 serves as a compressed preload spring region 74 to maintain a compression preload against at least one of the wire nut regions 68 and 72, and here illustrated as both of the wire nut regions 68 and 72.

As illustrated in FIG. 4, the nut assembly wire 61 has a first cross-sectional wire area in the first axial wire region 66, a second cross-sectional wire area in the second axial wire region 72, and a third cross-sectional wire area in the third axial wire region 76. In the preferred approach, the third cross-sectional wire area is less than either of the first cross-sectional wire area and the second cross-sectional wire area. The first cross-sectional wire area and the second cross-sectional wire area are the same. To make this configuration, the nut-assembly wire 61 is wound on a form as a nut-assembly wire coil having a substantially constant inner diameter and a first-axial-wire-region outer diameter, a second-axial-wire-region outer diameter, and a third-axial-wire-region outer diameter, all of which outer diameters are the same initially. A circumferentially extending volume of the material of the third axial wire region is removed, typically by grinding, along the third-axial wire-region outer diameter. The result is that the third-axial-wire-region outer diameter is less than either of the first-axial-wire-region outer diameter and the second-axial-wire-region outer diameter, and the first-axial-wire-region outer diameter and the second-axial-wire-region outer diameter remain the same. The third axial wire region is therefore more easily permanently deformed to introduce a permanent preset than are the other two axial wire regions.

A wire-nut-assembly housing 78 overlies the first wire nut region 62, the second wire nut region 68, and the third wire nut region 76. The embodiment of FIG. 4 is illustrated as having a single continuous wire-nut-assembly housing 78, but it may instead be made of wire-nut-assembly subhousings that are joined together to make the single wire-nut-assembly housing 78.

The first wire nut region 62 and the second wire nut region 68 are bonded to the wire-nut-assembly housing 78 by a respective first adhesive bond 80 and a second adhesive bond 82. At least one of the adhesive bonds 80 and 82 is a resilient bond to the wire-nut-assembly housing 78. In the embodiment of FIG. 4, the first adhesive bond 80 and/or the second adhesive bond 82 is a resilient adhesive bonds. An acceptable material for the hard adhesive bond is an epoxy such as ARMSTRONG A12/A&B, 3M. SCOTCHWELD 2214, or HYSOL Epoxy Patch 1CWH1. An acceptable material for the resilient adhesive bond is an RTV silicone such as GE 162 Silicone or GE 560 Silicone. The preload spring region 74 is not bonded to the wire-nut-assembly housing 78.

Any hard adhesive bond is substantially inflexible, while the resilient adhesive bond is flexible and allows a small amount of movement of the wire nut region 62 and/or 68 that is bonded with the resilient adhesive bond, responsive to the compressive force of the preload spring region 74. The resulting increased rigidity of the leadscrew 34 and the leadscrew wire nut assembly 60, in the region where the two contact each other, increases the amount of force that the leadscrew assembly 20 may transmit through the leadscrew 34 and the leadscrew wire nut assembly 60 of the leadscrew follower 36 without becoming mechanically unstable. It also avoids backlash when the direction of rotation of the leadscrew 34 is reversed. These improvements are attained while the leadscrew 34 maintains its relative insensitivity to misalignment in the preferred case of the absence of the shaft.

Figure 6:
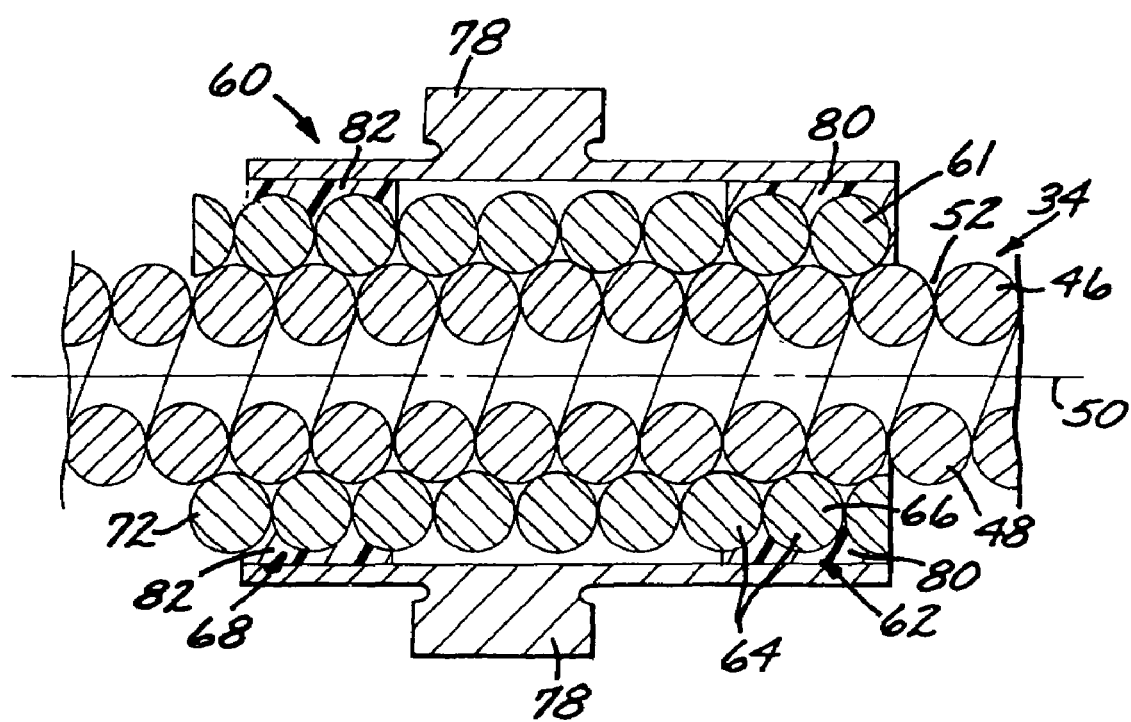
FIG. 6 is a side-sectional view like that of FIG. 4, of the wire-wound leadscrew with helically contacting turns, engaged to a second embodiment of the leadscrew wire nut assembly.

FIG. 6 illustrates a second preferred embodiment of the leadscrew wire nut assembly 60. If the outer diameter of the helix formed of the nut assembly wire 61 is so small that the circumferentially extending volume of material cannot be easily removed, as by grinding or machining, the second preferred embodiment may be used to introduce the preset permanent deformation. Comparable elements in FIG. 6 are assigned the reference numerals as in FIG. 4, and that discussion is incorporated here. As in the first preferred embodiment, the turns of the nut assembly wire 61 have substantially the same pitch, $P_{NA}$, as the pitch of the leadscrew thread wire 46, $P_L$, and the two helical coils are sized so that the turns of the nut assembly wire 61 mesh with and engage the turns of the leadscrew thread wire. In the embodiment of FIG. 6, one of the turns 64 of the nut assembly wire 61, termed the deformed turn, of the helix is deformed off-axis or axially to have a permanent deformation. The deformed turn is preferably the last turn or near the last turn of the nut assembly wire 61. As in the embodiment of FIG. 4, the first wire nut region 62, remote from the deformed turn, is affixed to the wire-nut-assembly housing 78 with the hard first adhesive bond 80, and the second wire nut region 68, including the deformed turn, is affixed to the wire-nut-assembly housing 78 with the resilient second adhesive bond 82. (There is no third wire nut region in this embodiment.) In this embodiment, the permanent deformation of the deformed turn provides a spring force that maintains the second wire nut region 68 in compression, thereby preventing play and backlash in the leadscrew wire nut assembly 60.

Figure 5:
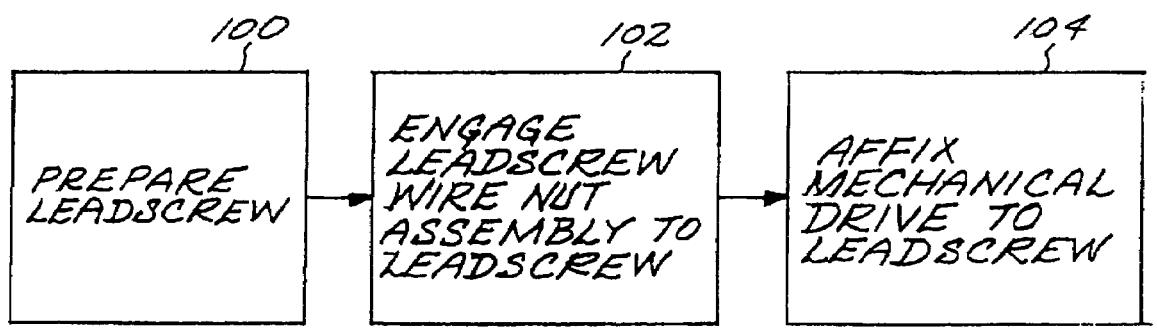
FIG. 5 is a block flow diagram of an approach for fabricating the leadscrew assembly.

FIG. 5 illustrates a preferred approach for fabricating the leadscrew assembly 20 of the first preferred embodiment of FIG. 4, and a similar approach is used to fabricated the leadscrew assembly of the second preferred embodiment of FIG. 6. The leadscrew 34 is prepared by wrapping, step 100, a plurality of leadscrew-thread turns 48 of the leadscrew thread wire 46 helically about the leadscrew axis 50 with the groove 52 between the leadscrew-thread turns 48. In a preferred approach, the leadscrew thread wire 46 is wound onto a form, and the form is removed. However, the form may remain to serve as the shaft 49, or a different shaft may be inserted.

The nut assembly wire 61 is furnished, and the axial wire regions 66, 72, and 76 are formed into the nut assembly wire 61 in a manner that facilitates the subsequent preloading. The nut assembly wire 61 is first wound to the desired helical shape on a form that provides it with the desired inner diameter of the helix. Before assembling it onto the leadscrew 34, the helical coil of the nut assembly wire is machined, typically by grinding, to reduce the outer diameter of the helical coil in the third axial wire region 76. This machining is readily done with the helical coil on its winding form, to maintain the shape of the helical coil. The helical coil is stretched axially so that the third axial wire region 76 is permanently deformed to a state where the natural pitch in the third axial wire region 76 is greater than that in either of the first axial wire region 66 and the second axial wire region 72. Upon assembly onto the constant-pitch leadscrew 34 whose pitch is matched to those of the first axial wire region 66 and the second axial wire region 76 of the leadscrew wire nut assembly 60, the third axial wire region 76 is in a compressive preload state. Thus, the preloaded wire nut assembly 60 is achieved with a single length of nut-assembly wire 61, rather than two lengths at the ends and a separate spring in the center, thereby keeping the piece count of the assembly small and simplifying the assembly process.

The leadscrew wire nut assembly 60 is engaged to the leadscrew 34, step 102. The leadscrew wire nut assembly 60 has any operable structure within the scope of the present approach, with the structure of FIG. 4 as described above being preferred.

The mechanical drive 38 is affixed in rotational communication with the leadscrew 34, step 104.

The present approach has been reduced to practice as a prototype of the FIG. 4 embodiment and a prototype of the FIG. 5 embodiment, and has been found to be operable as described herein.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A leadscrew assembly comprising:
   a leadscrew comprising a leadscrew thread wire helically wound about a leadscrew axis in a plurality of cylindrical leadscrew-thread turns and having a leadscrew-thread pitch; and
   a leadscrew wire nut assembly comprising
      a nut-assembly wire helically wound about the leadscrew axis in a plurality of cylindrical nut-assembly turns and having a nut-assembly-thread pitch, wherein the nut-assembly-thread pitch is substantially the same as the leadscrew-thread pitch, wherein the nut-assembly turns overlie and mesh with the leadscrew-thread turns, and wherein the nut-assembly wire has a permanent deformation therein,
      a wire-nut-assembly housing overlying and bonded to at least some of the nut-assembly turns, and
      a mechanical drive in rotational communication with the leadscrew.

2. The leadscrew assembly of claim 1, wherein the leadscrew wire nut assembly comprises
   the nut-assembly wire having a first axial wire region, a second axial wire region, and a third axial wire region lying between the first axial wire region and the second axial wire region,
   a first wire nut region comprising at least one turn of the first axial wire region overlying and engaged to a groove between the leadscrew-thread turns,
   a second wire nut region comprising at least one turn of the second axial wire region overlying and engaged to the groove between the leadscrew-thread turns, wherein the second wire nut region is spaced apart from the first wire nut region along the leadscrew axis, and wherein the third axial wire region maintains a compression preload against the first wire nut region and the second wire nut region.

3. The leadscrew assembly of claim 2, wherein the third axial wire region has a circumferentially extending volume of material removed therefrom.

4. The leadscrew assembly of claim 1, wherein the first wire nut region and the second wire nut region are bonded to the wire-nut-assembly housing, and wherein at least the second wire nut region is resiliently bonded to the wire-nut-assembly housing.

5. The leadscrew assembly of claim 1, wherein the nut-assembly wire has a first cross-sectional wire area in the first axial wire region, a second cross-sectional wire area in the second axial wire region, and a third cross-sectional wire area in the third axial wire region, and wherein the third cross-sectional wire area is less than either of the first cross-sectional wire area and the second cross-sectional wire area.

6. The leadscrew assembly of claim 1, wherein the nut-assembly wire is wound into a nut-assembly wire coil having a substantially constant inner diameter and a first-axial-wire-region outer diameter, a second-axial-wire-region outer diameter, and a third-axial-wire-region outer diameter, and wherein the third-axial-wire-region outer diameter is less than either of the first-axial-wire-region outer diameter and the second-axial-wire-region outer diameter.

7. The leadscrew assembly of claim 1, wherein the leadscrew has no shaft extending therethrough.

8. The leadscrew assembly of claim 1, wherein the leadscrew thread wire is helically wrapped in spaced-apart turns.

9. The leadscrew assembly of claim 1, wherein the leadscrew thread wire is helically wrapped in contacting turns.

10. The leadscrew assembly of claim 1, wherein the leadscrew assembly further includes
a motor that rotationally drives the leadscrew.

11. The leadscrew assembly of claim 1, wherein the wire-nut assembly housing is a single continuous piece of a wire-nut-assembly housing material.

12. The leadscrew assembly of claim 1, wherein the nut-assembly wire is a single continuous piece of wire material.

13. A leadscrew assembly comprising:
a leadscrew comprising a thread wire helically wrapped in a plurality of cylindrical-helix turns about a leadscrew axis and having a groove between the turns, wherein the leadscrew has no shaft extending therethrough;
a mechanical drive in rotational communication with the leadscrew; and
a leadscrew wire nut assembly comprising
a single length of nut-assembly wire wound in cylindrical wire-helix turns about the leadscrew axis with an inner diameter of the cylindrical-wire turns of the nut-assembly wire greater than an outer diameter of the cylindrical-helix turns of the thread wire, and wherein the nut-assembly wire has a first axial wire region, a second axial wire region, and a third axial wire region lying between the first axial wire region and the second axial wire region,
a first wire nut region comprising at least one turn of the first axial wire region overlying and engaged to the groove between the turns of the thread wire,
a second wire nut region comprising at least one turn of the second axial wire region overlying and engaged to the groove between the turns of the thread wire,
wherein the second wire nut region is spaced apart from the first wire nut region along the leadscrew axis,
wherein the nut assembly wire has a first cross-sectional wire area in the first axial wire region, a second cross-sectional wire area in the second axial wire region, and a third cross-sectional wire area in the third axial wire region, and wherein the third cross-sectional wire area is less than either of the first cross-sectional wire area and the second cross-sectional wire area, and
wherein the third axial wire region maintains a compression preload against the first wire nut region and the second wire nut region, and
a wire-nut-assembly housing overlying the first axial wire region, the second axial wire region, and the third axial wire region, wherein the first wire nut region and the second wire nut region are bonded to the wire-nut-assembly housing, and wherein at least one of the first wire nut region and the second wire nut region is compliantly bonded to the wire-nut-assembly housing.

14. The leadscrew assembly of claim 13, wherein the leadscrew assembly further includes
a motor that rotationally drives the leadscrew.

* * * * *